United States Patent [19]

Gross

[11] 4,359,635

[45] Nov. 16, 1982

[54] TRACKING DEVICE

[75] Inventor: Ulrich Gross, Eindhoven, Netherlands

[73] Assignee: U.S. Philips Corporation, New York, N.Y.

[21] Appl. No.: 186,076

[22] Filed: Sep. 11, 1980

[30] Foreign Application Priority Data

Apr. 3, 1980 [NL] Netherlands .......................... 8001974

[51] Int. Cl.³ ............................................... H04N 5/76
[52] U.S. Cl. ...................................... 250/201; 358/342
[58] Field of Search ...................... 250/201; 358/128.6

[56] References Cited

U.S. PATENT DOCUMENTS 3,854,015 12/1974 Janssen ............................. 358/128.6

Primary Examiner—David C. Nelms
Assistant Examiner—Darwin R. Hostetter
Attorney, Agent, or Firm—Thomas A. Briody; Robert T. Mayer; Algy Tamoshunas

[57] ABSTRACT

Device for scanning and following information tracks, for use in conjunction with "VLP" or "Compact Disk", tracking errors being mitigated by deriving an additional control voltage from the envelope of the information, which counteracts positional deviations of the information transducer relative to a desired track on the information carrier to an increased extent.

5 Claims, 3 Drawing Figures

TRACKING DEVICE

A device for accurately following a desired track on a carrier with adjacent information tracks, which device is provided with a transducer for converting (reading) the information in the tracks into electrical form and with control means for controlling the position of the transducer relative to the carrier in a direction transverse of the direction of the information tracks, deviations in the transverse direction of the transducer relative to a track to be read also being counteracted in that, a control signal which varies with the said positional deviation is applied to the said control means.

Examples of such devices are inter alia described in U.S. Pat. No. 3,854,015 with U.S. Pat. No. Re. 29,963 and in Neues aus der Technik of 15-12-78, page 2. In all these examples a control signal is produced, which depends on the deviation of the transducer position relative to the desired track. The control signal is zero if the transducer is in the desired position and increases in a positive or a negative sense if the positional deviation increases in the one of the other direction, passing through a maximum and a minimum, respectively, and decreasing to zero if the transducer is located halfway between two adjacent tracks.

When the transducer moves in a direction transverse of the tracks, the control signal thus exhibits a wave-like variation, either the rising or the falling positions of this wave corresponding to the stable operating range of the control system (return to the desired track), whilst the respective other (falling and rising) portions correspond to unstable operating ranges of the control system, which may cause the transducer to proceed to an adjacent track.

Such an effect may be very undesirable. Especially in the case of the "Compact Disk", where music programs are recorded in an optically readable coding on a rotary disc, shocks or the like may cause such a large positional deviation of the transducer relative to a desired track that the associated maximum or minimum in the control signal is exceeded, so that the control system becomes unstable and the transducer proceeds to a following track.

The invention proposes a very simple step in order to mitigate this undesired effect and to this end it is characterized in that, in addition to the control signal applied to the said control means, a signal derived from the envelope of the electric output signal of said transducer is applied so as to counteract any positional deviations to an increased extent.

In this respect it is to be noted that it is known per se from "Neues aus der Technick" of 15-12-78, page 2, no. 496, to derive a new control signal from the original (wave-shaped) control signal and the envelope of the signal supplied by the transducer. However, in that case the problems have other causes and the two signals are not combined so as to obtain an increased cancellation of any positional deviations.

The invention will be described in more detail with reference to the drawing.

Figure 1:
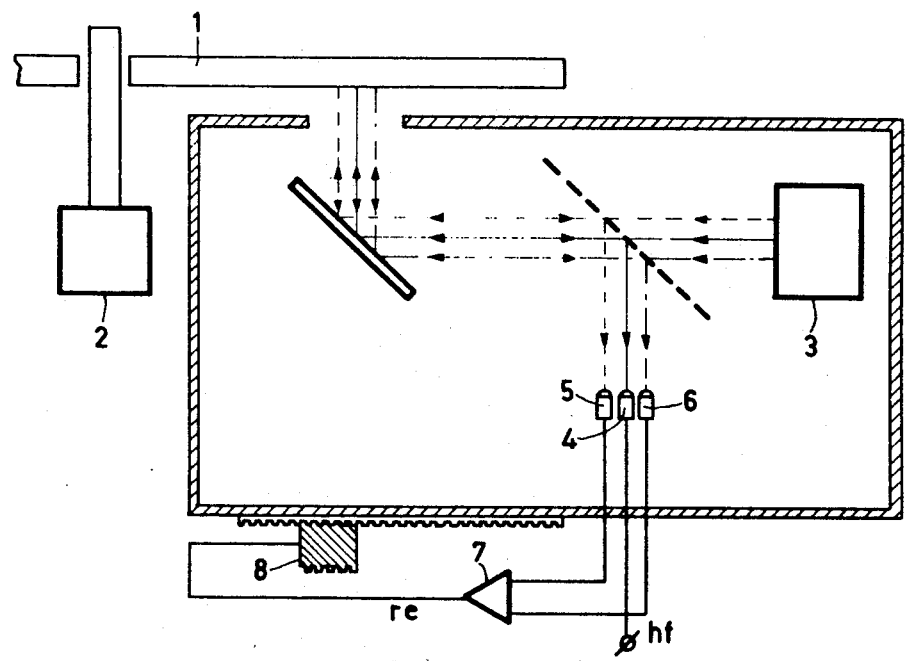
FIG. 1 represents a known tracking device for optically coded information carriers.

In FIG. 1 a disc-shaped carrier is designated 1, which carrier is provided with optically readable information. Examples of such carriers are known by the names of "VLP" (for pulsefrequency modulated video information) and "Compact Disk" (for digitized audio information). The carrier 1 is rotated by means of a motor 2, so that an information track on the carrier is moved past an optical transducer in order to read this information. Examples of such transducers are described comprehensively inter alia in U.S. Pat. No. 4,037,252 and the literature cited therein. They are all based on the principle of scanning the carrier 1 with the aid of a light source 3, so that by means of light-sensitive detectors 4, 5, 6 electric signals are generated, which respectively correspond to the information on the carrier 1 (detector 4) and to deviations of the scanning light-spot relative to the information track in the one (detector 5) and in the other sense (detector 6) respectively.

Figure 2:
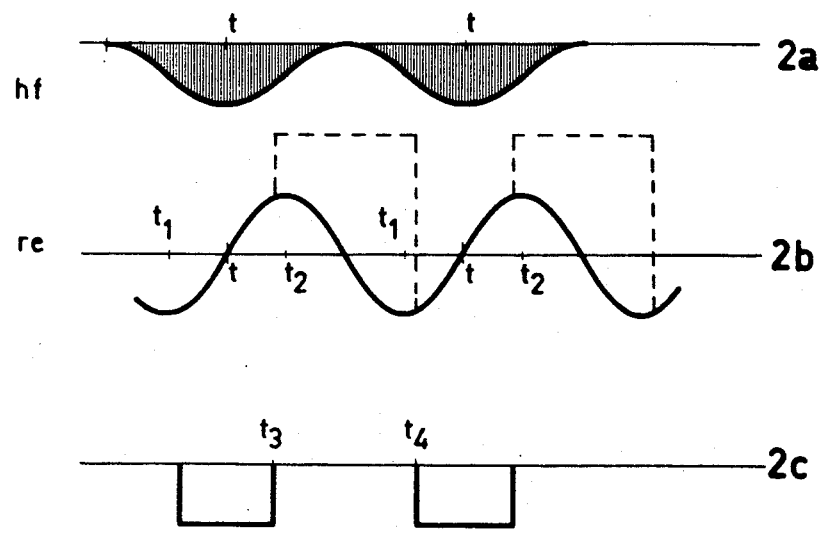
FIG. 2 represents voltages as a function of the position of deviation of the optical transducer relative to the information carrier.

Thus, the output of the detector 4 supplies a high-frequency signal "hf", whose amplitude is a maximum (situation t in FIG. 2a) when the scanning spot accurately coincides with the track to be scanned, but decreases to zero halfway between two scanning tracks. The outputs of the detectors 5 and 6 are arranged in push-pull (schematically represented by a push-pull amplifier 7), so that a control voltage "re" shown in FIG. 2b is obtained, which passes through zero both in the case of a correct position t of the scanning light-spot relative to the track and when said spot is located halfway between two tracks.

In the customary manner this control voltage is applied to a control element, for example a linear motor 8, which is capable of moving the optical transducer in the radial direction relative to the carrier 1.

The control system thus obtained is stable in the range $t_1$-$t_2$, when the control voltage increases (in a positive or a negative sense) as the positional deviation relative to the track increases, and is unstable in the intermediate ranges $t_2$-$t_1$, where the control voltage decreases. Consequently, if due to some cause the transducer has been moved so far away from the track to be scanned that the control system becomes unstable, the transducer will jump to a following track. The steps in accordance with the invention prevent or at least substantially mitigate this undesired effect.

In brief these steps involve the detection of the envelope of the output signal "hf" of the detector 4, so as to devise a further control sense. For this purpose said output signal is applied to a detector 11 (see FIG. 3), which supplies the envelope of said signal. Subsequently, it passes through a threshold device 12, so that depending on the positional deviation a voltage in accordance with FIG. 2c is generated. If desired, this voltage may be inverted in an inverter 13.

Figure 3:
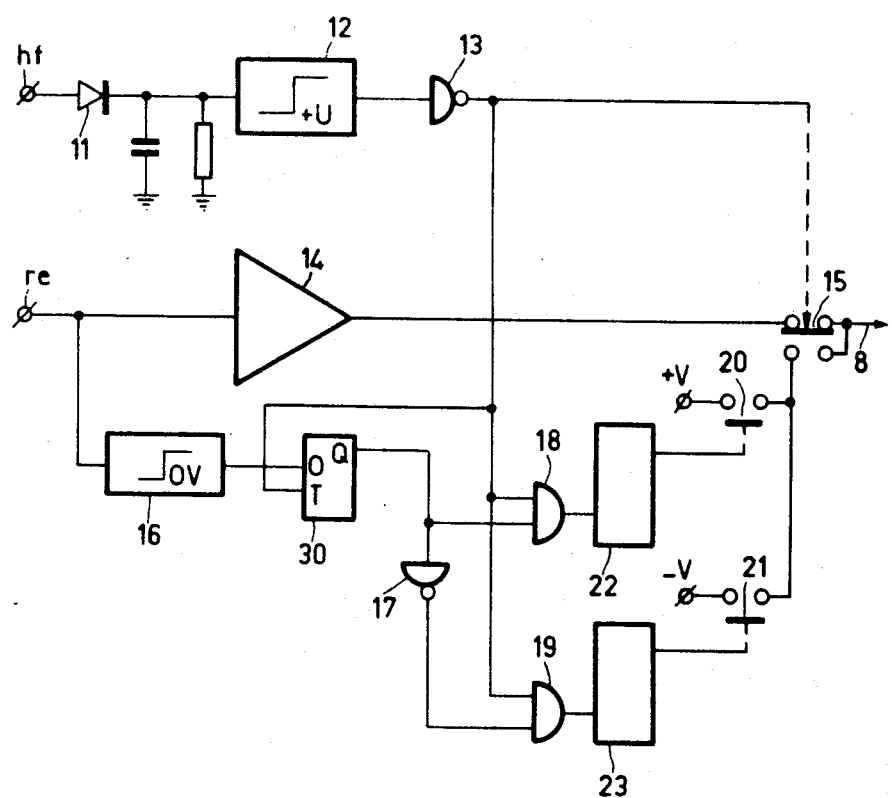
FIG. 3 represents the circuit arrangement employed in the apparatus in accordance with the invention, which arrangement is included between points hf and re respectively and 8 in the FIG. 1.

In contradistinction to FIG. 1, in the arrangement shown in FIG. 3, the control signal "re" is applied to the motor 8 via a switch 15, which switch is controlled by the output of the threshold device 12 or the inverter 13. The control signal "re" also passes through a threshold switch 16 and a flipflop 30 which is triggered by the output of the threshold device 12 or the inverter 13, for example a D-flipflop. Depending on the sign of "re" either a positive or a negative voltage is produced on the output of the threshold switch 16. The flipflop 30 holds this voltage and thus functions as a storage element. Its output voltage is applied directly to an AND-gate 18 or to an AND-gate 19 after being inverted in an inverter 17. In the range $t_3-t_4$, in which both the envelope of the voltage "hf" remains below the threshold value of the device 12 and the threshold switch 16 or the flipflop 30 supplies a positive output voltage, the AND-gate 18 will be opened, so that a switch 20 is closed, by means of which a positive voltage $+V$ is transferred to the control element 8 via the switch 15 (which is in its lower position in the range $t_3-t_4$). As a result of this, the original wave-shaped control voltage "re" of FIG. 2b is modified in accordance with the dashed line, so that the stable portion of the control range is in fact extended and the undesired positional deviation of the optical transduce relative to the desired track on the carrier 1 is strongly counteracted. The flipflop 30 thus ensures that the entire unstable portion of the control characteristic is bypassed.

In a similar way the AND-gate 18 will remain closed and the AND-gate 19 will be opened in the range $t_3-t_4$, in which the threshold switch 16 supplies a negative output voltage and the flipflop 30 a zero voltage, so that via a switch 21 a negative voltage $-V$ is transferred to the control element 8.

In general the control thus obtained suffices to ensure that the optical transducer keeps following the desired track. If point $t_4$ is exceeded, the original control is restored to operation and the optical transducer then tends to proceed to a following track. The effect in the case of a "Compact Disk" is similar to the pick-up stylus jumping out of the groove in a normal gramophone record. However, the control voltage generated in the range $t_3-t_4$ (dashed line in FIG. 2b) may be so high that the optical transducer would be given such an acceleration in the direction of the desired position t, that it overshoots this point and the control becomes operative again but now in the other direction, so that the transducer keeps moving to and fro. This effect can be controlled by a suitable choice of threshold value of the device 12 (which determines the length of the range $t_3-t_4$) and of the voltages $+V$ and $-V$ respectively. In addition, these voltages may be applied for a limited time (for example for 100 μsecs.), for example by including a timing circuit, for example a monostable multivibrator 22 (or 23) between the AND-gate 18 (or 19) and the switch 20 (or 21), so that this switch 20 (or 21) also remains closed for this limited time interval only.

It will be evident that the invention is equally suitable for use in a "Compact Disk" as in a "VLP". Moreover, it may for example be used in conjunction with magnetic disc stores, which employ magnetic transducers. In conjunction with the "Compact Disk" the motor used for moving the optical transducer relative to the information carrier will generally not be a linear motor, but said transducer will be mounted on a swivel arm, so that the movement is no longer perfectly linear.

The switches 15, 20, 21 shown in FIG. 1 are normally of the electronic type, for example of the MOS-type.

What is claimed is:

1. An apparatus for reading information from a record carrier having a plurality of adjacent information tracks, said apparatus comprising a transducer for converting information contained in said tracks into an electrical output signal, means for producing relative movement between said transducer and said record carrier so that said transducers scans a track to be read, said output signal having an envelope varying with transverse deviations in the position of said transducer relative to the center of the track being read, control means for moving said transducer relative to the record carrier in a direction transverse of the direction of the tracks, means for generating a control signal having a magnitude which varies with said transverse deviations in the position of said transducer and a positive or negative polarity dependent on the direction of said transverse deviations, and means responsive to the said envelope of said output signal for applying said control signal to said control means when said output signal exceeds a first value and for applying to said control means a further signal when said output signal falls below a second value, said further signal being a positive or a negative voltage and said applying means being arranged to apply to said control means said positive voltage if said control signal has a positive polarity and said negative voltage if said control signal has a negative polarity, said control means being responsive to said control and further signals and in response thereto moving said transducer so as to counteract any positional deviations thereby maintaining said transducer centered on the track being read.

2. The apparatus according to claim 1, wherein said first and second values are equal to a predetermined threshold value and said applying means includes switch means which couples said control signal to said control means when said envelope exceeds said threshold value and which couples said further signal to said control means when said output signal falls below said threshold value.

3. The apparatus according to claims 1 or 2, wherein said applying means includes a gate circuit which is coupled to said control signal and said envelope of said output signal and which transfers said positive or negative voltage in dependence on said polarity of said control voltage.

4. The apparatus according to claim 3, including a timing circuit coupled between said gate circuit and said control means and arranged so as to apply said positive or negative voltage to said control means for a limited time interval.

5. The apparatus according to claim 3, wherein said gate circuit is preceeded by a flip-flop which is triggered by said envelope of said output signal.

* * * * *